US011720364B2

(12) United States Patent
Alam et al.

(10) Patent No.: US 11,720,364 B2
(45) Date of Patent: Aug. 8, 2023

(54) METHODS AND APPARATUS TO DYNAMICALLY ENABLE AND/OR DISABLE PREFETCHERS

(71) Applicant: Intel Corporation, Santa Clara, CA (US)

(72) Inventors: Hanna Alam, Jish (IL); Leeor Peled, Hefer (IL); Refael Mizrahi, Raanana (IL); Amir Leibovitz, Biniamina (IL); Jonathan Beimel, Michmoret (IL); James Hermerding, II, Vancouver, WA (US); Gilad Olswang, Kfar Menahem (IL); Michal Moran, Tel Aviv (IL); Moran Peri, Kiryat Motzkin (IL); Ido Karavany, Giv'ot Bar (IL); Sudheer Nair, Portland, OR (US); Hadas Beja, Yehud-Monosson (IL); Avishai Wagner, Kfar Saba (IL); Ronen Laperdon, Modiin (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/033,282

(22) Filed: Sep. 25, 2020

(65) Prior Publication Data
US 2021/0011726 A1    Jan. 14, 2021

Related U.S. Application Data

(60) Provisional application No. 63/000,975, filed on Mar. 27, 2020.

(51) Int. Cl.
*G06F 9/38* (2018.01)
*G06F 9/30* (2018.01)
(Continued)

(52) U.S. Cl.
CPC ........ *G06F 9/3802* (2013.01); *G06F 9/30043* (2013.01); *G06F 9/30047* (2013.01); *G06F 9/505* (2013.01); *G06F 11/3024* (2013.01)

(58) Field of Classification Search
CPC .................................................... G06F 9/3802
See application file for complete search history.

(56) References Cited

U.S. PATENT DOCUMENTS

| 6,055,650 A * | 4/2000 | Christie | G06F 9/383 |
| | | | 710/15 |
| 6,594,730 B1 * | 7/2003 | Hum | G06F 13/1673 |
| | | | 711/118 |

(Continued)

OTHER PUBLICATIONS

European Patent Office, "European Search Report," issued in connection with Application No. 20213528.1, dated Jun. 30, 2021, 6 pages.

*Primary Examiner* — William B Partridge
(74) *Attorney, Agent, or Firm* — Hanley, Flight & Zimmerman, LLC

(57) ABSTRACT

Disclosed Methods, Apparatus, and articles of manufacture to dynamically enable and/or disable prefetchers are disclosed. An example apparatus include an interface to access telemetry data, the telemetry data corresponding to a counter of a core in a central processing unit, the counter corresponding to a first phase of a workload executed at the central processing unit; a prefetcher state selector to select a prefetcher state for a subsequent phase based on the telemetry data; and the interface to instruct the core in the central processing unit to operate in the subsequent phase according to the prefetcher state.

28 Claims, 7 Drawing Sheets

(51) Int. Cl.
   *G06F 11/30*   (2006.01)
   *G06F 9/50*    (2006.01)

(56) References Cited

U.S. PATENT DOCUMENTS

| | | | |
|---|---|---|---|
| 10,496,542 B1* | 12/2019 | Allu | G06F 11/1458 |
| 2004/0123043 A1* | 6/2004 | Rotithor | G06F 12/0215 |
| | | | 711/137 |
| 2007/0214335 A1* | 9/2007 | Bellows | G11C 7/1051 |
| | | | 711/167 |
| 2009/0019229 A1 | 1/2009 | Morrow et al. | |
| 2011/0113199 A1* | 5/2011 | Tang | G06F 12/0862 |
| | | | 711/130 |
| 2015/0178207 A1* | 6/2015 | Susarla | G06F 11/3466 |
| | | | 711/135 |
| 2016/0253264 A1* | 9/2016 | Bose | G06F 11/348 |
| | | | 711/137 |
| 2017/0123985 A1 | 5/2017 | Hooker et al. | |
| 2018/0024932 A1* | 1/2018 | Nachimuthu | G06F 3/0673 |
| | | | 711/213 |
| 2019/0042129 A1* | 2/2019 | Tarango | G06F 3/067 |
| 2019/0042434 A1* | 2/2019 | Gough | H04L 12/4633 |
| 2019/0213130 A1* | 7/2019 | Madugula | G06F 12/1045 |
| 2019/0229897 A1* | 7/2019 | Verrall | H04L 9/0836 |
| 2020/0142698 A1* | 5/2020 | Karve | G06F 12/0862 |
| 2021/0200860 A1* | 7/2021 | Gendler | G06F 9/3802 |

\* cited by examiner

METHODS AND APPARATUS TO DYNAMICALLY ENABLE AND/OR DISABLE PREFETCHERS

RELATED APPLICATION

This patent arises from a U.S. Non-Provisional Patent Application of U.S. Provisional Patent Application No. 63/000,975, which was filed on Mar. 27, 2020. U.S. Provisional Patent Application No. 63/000,975 is hereby incorporated herein by reference in its entirety. Priority to U.S. Provisional Patent Application No. 63/000,975 is hereby claimed.

FIELD OF THE DISCLOSURE

This disclosure relates generally to processors, and, more particularly, to methods and apparatus to dynamically enable and/or disable prefetchers.

BACKGROUND

A prefetcher is a protocol performed by a central processing unit that speeds up operation of the central processing unit by caching data stored in memory that have a high probability of being used by the central processing unit. In this manner, the central processing unit can search for data in the cache before searching the memory. Because the central processing unit can obtain data from cache faster than obtaining data from memory, the central processing unit operates faster and/or more efficiently when the central processing unit finds the data in the cache as opposed to the memory.

BRIEF DESCRIPTION OF THE DRAWINGS

The figures are not to scale. In general, the same reference numbers will be used throughout the drawing(s) and accompanying written description to refer to the same or like parts.

Figure 1:
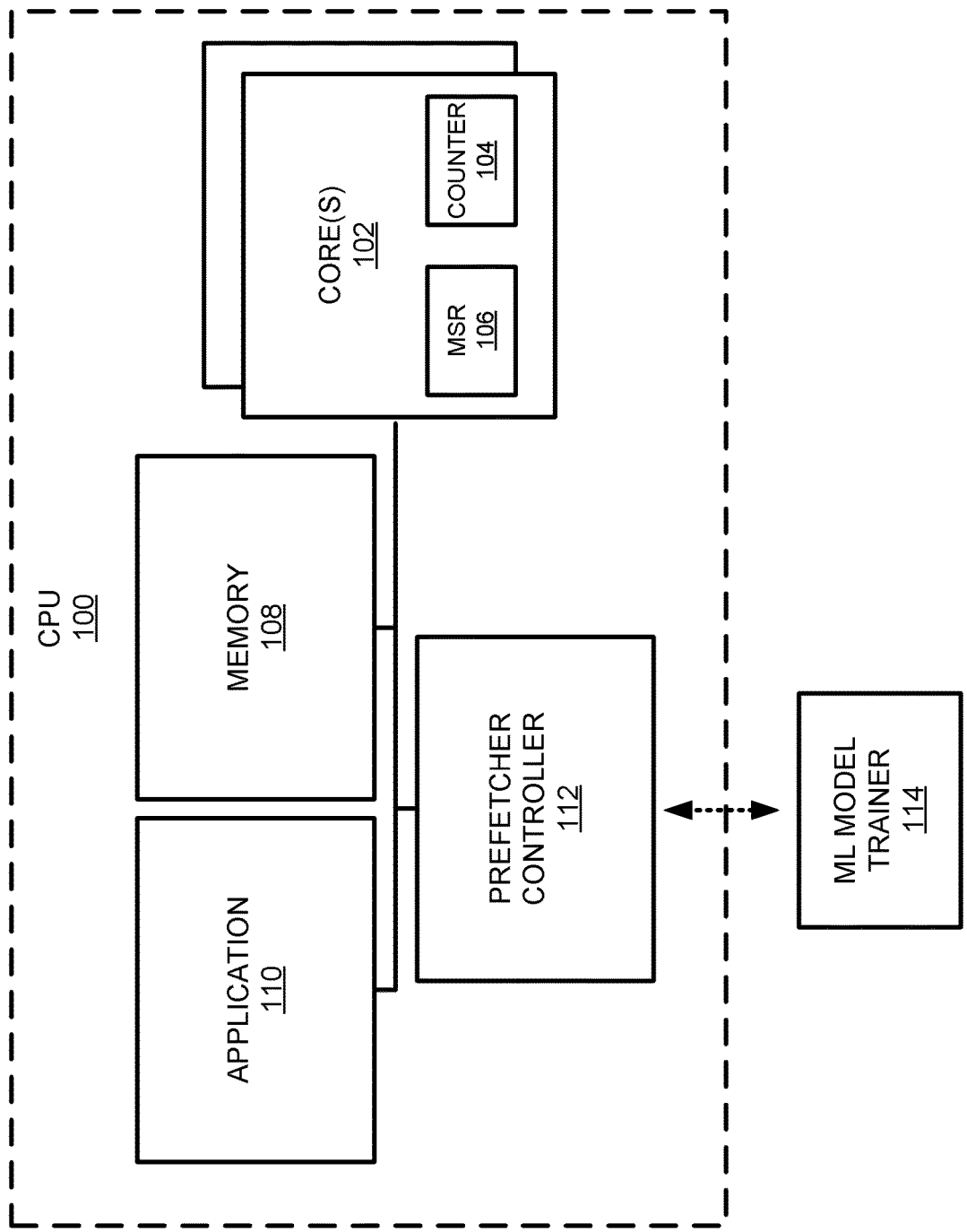
FIG. 1 is a block diagram of an example implementation of a central processing unit described in conjunction with examples disclosed herein.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components

DETAILED DESCRIPTION

A central processing unit (CPU) is electronic circuitry that executes instructions making up a program or workload. A CPU may include one or more processor cores to execute the instructions by accessing data from main memory. Because it takes time (e.g., latency) to access data from main memory, the one or more processor cores may obtain data from the memory and store it locally in cache. The cache is smaller and faster than the main memory. In this manner, the processor cores can use and/manipulate the data locally in cache with less latency by interfacing with the main memory less often.

To further decrease latency and/or boost performance, a processor core may implement a prefetcher. A prefetcher, a prefetcher protocol, or prefetching is a protocol where a processor core prefetches data or instructions from memory before the data and/or instruction is needed. For example, before instructions are executed by a core, the prefetching protocol obtains data and/or sections of code from memory and stores the obtained data or code in cache. There may be multiple types of prefetchers that may be enabled and/or disabled (e.g., a level 1 (L1) prefetcher, a level 2 (L2) prefetcher, a level 3 (L3) prefetcher, etc.). If the prefetcher protocol prefetches data that is later used by the core, the performance and latency are improved. However, a prefetcher protocol that prefetches data that is not used by the core (e.g., useless prefetching, wrong prefetching, etc.), the cores consume additional memory bandwidth which can cause cache thrashing and can cost additional power. Some workloads are more prone to useless prefetching and exhibit improvement when the prefetcher is disabled. Accordingly, examples disclosed herein dynamically enable and/or disable one or more prefetchers based on telemetry data sampled at phases of the workload. Telemetry data includes data that is used to monitor performance of the cores and/or any other component of the CPU (e.g., the uncore).

To determine the telemetry data, examples disclosed herein may obtain counts from performance counters to identify, for example, instructions per second, useless prefetches, stress telemetry in the core and uncore, cache hit rates, etc. based on a current sample phase or a previous sample phase. Each phase represents a point in time where the telemetry data is sampled and/or processed (e.g., every 500 milliseconds). Examples disclosed herein use such telemetry data from the current phase and/or previous phases to enable or disable one or more prefetcher protocols for a subsequent phase, thereby increasing the efficiency and/or usefulness of prefetcher usage in a CPU. In some examples disclosed herein, a machine learning model (e.g., a DL model, a neural network, and/or any other AI-based model) may be trained to select whether a prefetcher should be enabled or disabled for the cores of a CPU based on known telemetry training data. In this manner, examples disclosed herein may be used to determine whether a subsequent phase should have a prefetcher be enabled or disabled using a trained model based on telemetry data of the current phase and/or previous phases. A current phase corresponds to the current time when the telemetry data is sampled and/or processed and a previous phases correspond to previous points in time when previous telemetry data was sampled and/or processed.

FIG. 1 is a block diagram of an example implementation of an example central processing unit (CPU) 100. The example CPU 100 of FIG. 1 includes example core(s) 102, example counter(s) 104, example model specific register(s) (MSR(s)) 106, an example memory 108, an example application 110, and an example prefetcher controller 112. The example CPU 100 receives trained models (e.g., machine learning (ML) models, trained neural network data, etc.) from an example ML model trainer 114.

The example CPU 100 of FIG. 1 may be an embedded system, a field programmable gate array, a shared-memory controller, a network on-chip, a networked system, and/or any other circuitry that includes a hardware (e.g., semiconductor based) processor, memory, and/or cache. The example CPU 100 utilizes processor resources (e.g., the example memory 108, register(s) and/or logic circuitry of the example processor core(s) 102) to execute instructions to implement the example application 110.

The example processor core(s) 102 of FIG. 1 execute(s) instructions (e.g., a workload) from the example application 110 (e.g., by reading and/or writing data). In some examples, the core(s) may employ one or more prefetchers (e.g., L1 prefetcher, L2 prefetcher, etc.). A prefetcher predicts accesses to the memory 108, fetches the predicted data from the memory 108, and stores the data into local cache (e.g., cache of the core(s) 102) ahead of time to mitigate memory latency. Some prefetchers (e.g., the level 3 (L2) cache prefetcher) are more aggressive in terms of prediction depth (e.g., how much data to gather ahead of time) and/or rate (e.g., prefetcher degree). Accordingly, such prefetchers have a high likelihood of obtaining the wrong data ahead of time (e.g., obtaining the wrong prefetches) that consume memory bandwidth, which causes cache thrashing and increases power consumption. Some workloads or run phases (e.g., instructions executed by the core(s) 102) are more prone than others to inefficient prefetching and work more efficiently when one or more prefetchers are disabled. Accordingly, as further described below, the example prefetcher controller 112 dynamically determines whether to enable or disable a prefetcher for an upcoming phase based on telemetry data of the core(s) 102.

The example core(s) 102 of FIG. 1 include(s) the MSR 106 and/or the counter 104. The example event counter(s) 104 is/are performance counters that monitor any or all of a wide range of events (e.g., completion of output operations, number of retired instructions, clock cycles, CPU clock data, total number of L3 CPU stalls and/or cache misses, total number of L2 CPU stall and/or cache misses, total number of L1 CPU stalls and/or cache misses, LS lines out, etc.). The event counter(s) 104 may be implemented in registers, memory on the core(s) 102, a content addressable memory (CAM) structure, etc. The data corresponding to the counts in the event counter(s) 104 is part of the telemetry data used by the example prefetcher controller 112 to dynamically enable and/or disable prefetchers.

The MSR 106 of FIG. 1 is a register that stores a value corresponding to whether a prefetcher is enabled during a current phase or to be enabled during a subsequent phase of a workload. As further described below, the example prefetcher controller 112 changes the value stored in the MSR 106 of the core(s) 102 after a decision has been made to enable and/or disable a prefetcher. In this manner, the core(s) 102 can read the value in the MSR 106 periodically, aperiodically, and/or based on a trigger to enable and/or disable prefetcher(s).

The example memory 108 of FIG. 1 is memory of the example CPU 100. However, it could alternatively be memory external to, but accessible to the CPU (e.g., off chip memory). The memory 108 stores data that the example application 110 can access using the example cores 102. When a prefetcher is enabled, the core 102 accesses data from the core 102 before the application calls for the data. The core 102 stores the data in local caches for use in executing instructions.

The example application 110 of FIG. 1 may exhibit one or more computation phases to perform one or more tasks. The example application 110 uses the resources of the core to carry out instructions to perform the one or more tasks.

The example prefetcher controller 112 of FIG. 1 samples various telemetry data (e.g., telemetry metrics) of the CPU 100 and performs a prediction of the usefulness of a prefetcher to the CPU performance during a subsequent phase based on the current and/or previous telemetry metrics of the CPU 100. For example, the prefetcher controller 112 monitors the performance of the core(s) 102 when executing the instructions of the application 110 to determine whether to enable or disable a prefetcher based on telemetry data (e.g., data corresponding to the operation of the core(s) 102 and uncore (e.g., components of the CPU 100 outside of the core 102)). In some examples, the prefetcher controller 112 implements a first mode that performs a protocol to sample telemetry metrics (e.g., number of instructions retired from the previous state and the amount of time since the previous state) from the counter(s) 104 of the cores(s) 102 at a current phase. The example prefetcher controller 112 determines a telemetry score (e.g., instructions per second (IPS) (e.g., the number of instructions retired divided by the time)) of the core(s) 102 based on the telemetry metrics and the current prefetcher state (e.g., enabled). In the first mode, the prefetcher controller 112 aggregates the telemetry scores across the core(s) 102 and determines a first value (e.g., score) corresponding to the aggregate score with previous aggregate scores corresponding to the same prefetcher state (e.g., enabled) and compares the aggregate score to a second value corresponding to aggregate score corresponding to a prefetcher state (e.g., disabled). The value may be an average aggregate score, a weighted average aggregate score, an empirical value based no two or more aggregate scores, etc. For example, the prefetcher controller 112 can determine that the average aggregate score of a prefetcher state (e.g., enabled) is 0.7, if pervious aggregate scores for same prefetcher state (e.g., enabled) are 0.6 and 0.8. The example prefetcher controller 112 selects the prefetcher state of the next phase based on which value was higher (e.g., If the IPS of the disabled prefetcher state is higher, the prefetcher controller 112 will select the next prefetcher state to be disabled). In some examples, the prefetcher controller 112 additionally or alternatively compares the aggregate telemetry scores and/or the telemetry score of each core 102 to the second value of the opposite prefetcher state (e.g., if the first prefetcher stat is enabled, the opposite prefetcher state is disabled). The example prefetcher controller 112 writes a value corresponding to the determined prefetcher state in the MSR(s) 106 of the core(s) 102. In this manner, the example core(s) 102 will enable or disable the prefetcher(s) based on the value stored in the MSR(s) 106.

In other examples, the prefetcher controller 112 implements a second mode that performs a protocol to sample (a) telemetry data (e.g., metrics including an amount of time since the previous state, the number of L1, L2, and/or L3 misses and/or stalls, number of lines prefetched but not used, etc.) from the counter(s) 104 of the cores(s) 102 at a current phase and (b) uncore telemetry data (e.g., metrics from the CPU 100 including combo box activity, combo miss activity, combo box miss occupancy, etc.). The example prefetcher controller 112 uses the sampled telemetry metrics in a ML model (e.g., a neural network) to estimate whether the next phase should have prefetcher(s) enabled or disabled. For example, the neural network may be trained to estimate whether it is more efficient to have the prefetcher(s) enabled or disabled based on the IPS of the current phase, number of L3 misses per cycle, number of off-core requests from a buffer per instruction, and the number of high occupancy cycles per instruction. In the second mode, the prefetcher controller 112 inputs the telemetry data into the ML model per core, resulting in N number of output prefetcher states corresponding to the N cores. In some examples, the prefetcher controller 112 globally enables or disables prefetcher for all core(s) 102 based on the majority output (e.g., an output corresponding to enable or disable). In some examples, the prefetcher controller 112 enables or disables prefetcher(s) for each core based on the corresponding output (e.g., for a subsequent phase, enable(s) prefetcher(s) for a first core when the ML output corresponds to enabling and disabling prefetcher(s) for a second core when the ML output corresponds to disable). In either the first or the second mode, the prefetcher controller 112 can sample at any frequency (e.g., corresponding to longer or shorter sampling phases) based on user and/or manufacturer preferences. Sampling at a higher frequency enables the prefetcher controller 112 to detect shorter phases and react faster to changes in the workload that merit changing prefetcher status at the cost of increase overhead from an increased number of calculations. Sampling at a lower frequency decreases reaction time of the prefetcher controller 112 but lowers overhead due to the decreased number of calculations.

In some examples, the prefetcher controller 112 dynamically adjusts the sample frequency based on user preferences and/or based on certain preset events. For example, if resources of the prefetcher controller 112 are low (e.g., the amount of available processor resources, memory, etc. are below one or more thresholds), the example prefetcher controller 112 may decrease the sampling frequency and when the resources are high (e.g., above one or more thresholds), the prefetcher controller 112 may increase the sampling frequency. In another example, the prefetcher controller 112 may adjust the sampling frequency based on the protocol and/or instructions being executed by the core(s) 102. For example, some protocols and/or instructions may be flagged as more important and/or more prone to useless prefetches, stress telemetry in the core and uncore, cache hit rates. In such examples, the prefetcher controller 112 may increase the sample frequency when such protocols and/or instructions are being executed and decrease the frequency when such protocols and/or instructions are not being executed. In some examples, the prefetcher controller 112 may adjust the frequency based on the amount of change between prefetcher states. For example, if more than a threshold percentage of the past X prefetcher states correspond to a change from the corresponding previous prefetcher state, the prefetcher controller 112 may increase the sample frequency or apply a high sample frequency. In such examples, if more than a threshold percentage of the past X prefetcher states do not correspond to a change from the corresponding previous prefetcher state, the prefetcher controller 112 may decrease the sample frequency or apply a low sample frequency.

The example ML model trainer 114 of FIG. 1 trains a ML model (e.g., a neural network, a DL model, and/or any other type of AI-based model) to be able to predict whether it will be more efficient to enable or disable one or more prefetchers during a subsequent phase based on telemetry data of a current phase and/or telemetry data of past phases. In the example of FIG. 1, the ML model trainer 114 is located remotely from the CPU 100 (e.g., at an offsite server or computing device). However, in some examples the ML model trainer 114 may be implemented in the CPU 100. After the ML model trainer 114 trains a model, the ML model trainer 114 deploys the model (e.g., the model data used to implement the trained model locally at the CPU 100) to the CPU 100. For example, the ML model trainer 114 may train a model and deploy it to the CPU 100 when the prefetcher controller 112 is first generated and/or manufactured. Additionally or alternatively, the ML model trainer 114 may wirelessly deploy a model to the prefetcher controller 112 as part of a software-based update and/or as part of a request from the CPU 100.

The example ML model trainer 114 of FIG. 1 uses labelled training data to train a model. The labelled training data corresponds to telemetry data that has been labelled with the more efficient prefetcher state (e.g., enabled or disabled). The example ML model trainer 114 obtains the labelled training data from one or more device(s) that have executed numerous workloads with prefetcher(s) enabled and/or prefetcher(s) disabled and measured the corresponding telemetry data. In this manner, the one or more devices can compare the results of a different phase of various workloads that were performed with the prefetcher(s) on and/or prefetcher(s) off to determine which telemetry data corresponds to a more efficient prefetcher state. The number and/or type of training telemetry data used to train a model is based on user and/or manufacturer preferences. Less metrics avoid overfitting and are faster, but more metrics may result in a more accurate result.

In some examples, the ML model trainer 114 of FIG. 1 may explore several learning models from simple logistic regression to advanced long short term memory (LSTM) models and evaluate the relative usefulness of different telemetry data. For example, the ML model trainer 114 may determine a first subset of counters using backward feature selection, where the entire set of counters are selected and an iterative process is performed where each iteration the least significant feature is dropped. After the ML model trainer 114 determines that more than a threshold amount of degradation of the results is shown, the ML model trainer 114 may generate a neural network based on the telemetry data corresponding to IPS, L3 misses per cycle, off-core buffer requests per instruction, and number of high occupancy cycles per instruction. In such an example, the ML model trainer 114 feeds the remaining metrics into an auto-regression network trained offline and performs an inference phase. The output would be the prefetcher enable/disable decision per core. For example, the ML model trainer 114 may train the neural network to have three layers. A first layer may be an auto-regression network (e.g., instead of looking only on the current sample the model may take into account X number of previous timestamps). The second layer may be a middle-hidden layer with nonlinearity exponential linear unit (ELU) activation based on a threshold number of added neurons to optimize the prediction (e.g., $ELU=e^{\wedge}(x)-1$ if $x<=0$, else x). The third layer may be a signal neuron operating as a sigmoid function (e.g., to change the result to a probability between 0 and 1). In this manner, the prefetcher controller 112 can determine whether the output corresponds to enable or disable based on the probability (e.g., if the output is less than 0.5 the prefetcher should be disabled and if the output is more than 0.5 the prefetcher should be enabled).

Figure 2:
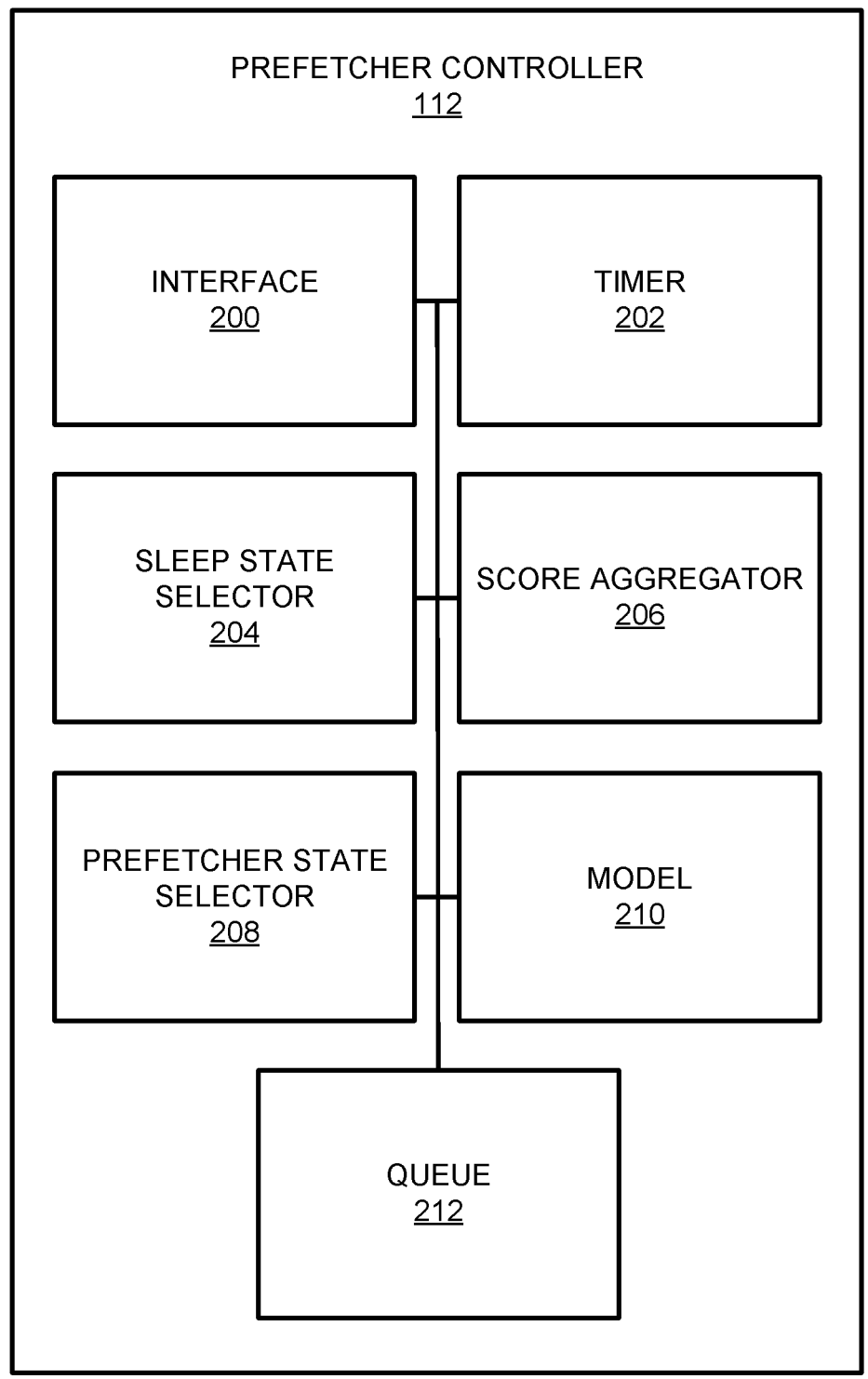
FIG. 2 is a block diagram of an example implementation of the prefetcher controller of FIG. 1.

FIG. 2 is a block diagram of an example implementation of the prefetcher controller 112 of FIG. 1. The example prefetcher controller 112 includes an example interface 200, an example timer 202, an example sleep state selector 204, an example score determiner 206, an example prefetcher state selector 208, an example model 210, and an example queue 212.

The example interface 200 of FIG. 2 obtains telemetry data (e.g., metrics corresponding to the operation of the core(s) 102 and uncore (e.g., components of the CPU 100 outside of the core 102)) from the example core(s) 102 and/or other components of the CPU 100. Additionally, the example interface 200 obtains a prefetcher state (e.g., the prefetcher state of the current phase) from storage (e.g., the MSR 106, the example storage 206, and/or another storage). Additionally, the example interface 200 interfaces with the core(s) 102 to instruct the core to operate according to a selected prefetcher state. In some examples, the interface 200 obtains model data (e.g., machine learning model data) from the ML model trainer 114. The model data corresponds to how to adjust the model 210 to implement a trained model.

The example timer 202 of FIG. 2 tracks an amount of time. In some examples, the timer 202 tracks time based on a counter or a clock of the example CPU 100 and/or one or more of the core(s) 102. The example timer 202 tracks the time until a threshold amount of time has elapsed. In this manner, the example prefetcher controller 112 can switch between a sleep mode or low power mode and a wake or high power mode. The threshold amount of time may be based on a sampling frequency of the prefetcher controller 112. The example sleep state selector 204 selects a sleep state that adjusts based on the time tracked by the timer 202. For example, the sleep state selector 204 enters into sleep mode after a prefetcher state has been selected and exits the sleep mode (e.g., wakes up) after the timer 202 has identified a threshold amount of time occurring.

The example score determiner 206 of FIG. 2 determines telemetry scores for the core(s) 102 for a current phase based on obtained telemetry metrics. For example, the example score determiner 206 may determine the IPS for the respective core(s) 102 by dividing the number of retired instructions of each core by the amount of time since the last phase, resulting in X IPSs for the X cores. Additionally, the example score determiner 206 aggregates the telemetry scores across the core(s) for the current phase by adding the X IPSs. After the telemetry scores are aggregated, the example score determiner 206 stores the telemetry scores and/or aggregated telemetry scores for the current state in the queue 212, in conjunction with the current prefetcher state. If the queue 212 is full when the example score determiner 206 attempts to store the scores for the current state, the score determiner 206 may remove the oldest entry in the queue 212. As described below, the prefetcher state selector 208 can compare the current IPSs to previous IPSs to determine whether to enable one or more prefetchers. Accordingly, the example score determiner 206 may need to ensure that the cache has at least one entry for a previous phase for each prefetcher state. Thus, the example score determiner 206 may determine if removing the oldest entry in the queue 212 will result in all entries corresponding to the same prefetcher state. If the score determiner 206 determines that removing the oldest entry from the queue 212 will result in all entries corresponding to the same prefetcher state, the score determiner 206 may remove an entry different than the oldest entry (e.g., the second oldest entry) from the queue 212.

The example prefetcher state selector 208 of FIG. 2 selects the one or more prefetcher states for the next phase based on the current and previous prefetcher states and the corresponding telemetry data. To determine the prefetcher state(s) (e.g., enabled or disabled) for the next phase, the prefetcher state selector 208 calculates a value corresponding to the telemetry score (e.g., an average, a weighted average, an empirical score, etc.) for the enabled states stored in the queue 212 and a second value corresponding to telemetry score for the disabled states stored in the queue 212. If (a) the value corresponding to the enabled state is higher than the second value corresponding to the disabled state (e.g., by more than a first threshold amount) and (b) the telemetry scores of the current phase is higher than the value corresponding to the opposite prefetcher state (e.g., by more than a second threshold amount), the example prefetcher state selector 208 selects the prefetcher state to be the enabled state for the next phase. If (a) the value corresponding to the telemetry score corresponding to the enabled state is not higher than the second value corresponding to the telemetry score corresponding to the disabled state (e.g., by more than a first threshold amount) or (b) the telemetry scores of the current phase is not higher than the value corresponding to the opposite prefetcher state (e.g., by more than a second threshold amount), the example prefetcher state selector 208 selects the prefetcher state to be the disabled state for the next phase.

The example model 210 of FIG. 2 implements a trained model developed by the example ML model trainer 114. The model 210 may be a machine learning model, a neural network, a deep learning model, and/or any other AI-based model. As described above in conjunction with FIG. 1, the ML model trainer 114 trains a model to be able predict whether it will be more efficient to enable or disable one or more prefetchers during a subsequent phase based on telemetry data of the current phase and/or telemetry data of past phases. The example model 210 implements the trained model from the ML model trainer 114. Accordingly, inputs to the example model 210 include received (a) telemetry metrics (e.g., amount of time since the previous state, the number of L1, L2, and/or L3 misses and/or stalls, number of lines prefetched but not used, etc.) from the counter(s) 104 of the cores(s) 102 at a current phase and (b) uncore telemetry metrics from the CPU 100 (e.g., combo box activity, combo miss activity, combo box miss occupancy, etc.), and outputs of the example model 210 include one or more prefetcher states based on the inputs. The example model 210 may be trained to estimate whether it is more efficient to have the prefetcher(s) enabled or disabled based on the IPS of the current phase, number of L3 misses per cycle, number of off-core requests from a buffer per instruction, and the number of high occupancy cycles per instruction. The example model 210 may determine a prefetcher state per core, resulting in N number of output prefetcher states corresponding to the N cores.

In some examples, when the example model 210 of FIG. 2 determines the prefetcher state, the prefetcher state selector 208 may globally enable or disable prefetchers for all core(s) 102 based on the majority output (e.g., an output corresponding to enable or disable). In some examples, the prefetcher state selector 208 enables or disables prefetcher(s) for each core based on the corresponding output (e.g., for a subsequent phase, enable prefetcher for a first core when the ML output corresponds to enable and disable prefetcher for a second core when the ML output corresponds to disable).

The example queue 212 of FIG. 2 is storage to store the prefetcher state(s) and/or corresponding telemetry data (e.g., telemetry metrics), telemetry scores, and/or aggregated telemetry scores. For example, the queue 212 may be a buffer, one or more registers, memory, cache, etc. As described above, when the queue 212 is full, the example score determiner 206 determines which entries to remove from the queue 212 to make room for more information.

While an example manner of implementing the example prefetcher 112 and/or the example ML model trainer 114 of FIG. 1 is illustrated in FIGS. 1 and/or 2, one or more of the elements, processes and/or devices illustrated in FIGS. 1 and/or 2 may be combined, divided, re-arranged, omitted, eliminated and/or implemented in any other way. Further, the example interface 200, the example timer 202, the example sleep state selector 204, the example score determiner 206, the example prefetchers state selector 208, the example model 210, the example queue 212, and/or, more generally, the example prefetcher controller 112 of FIG. 2 and/or the ML model trainer 114 of FIG. 1 may be implemented by hardware, software, firmware and/or any combination of hardware, software and/or firmware. Thus, for example, any of the example interface 200, the example timer 202, the example sleep state selector 204, the example score determiner 206, the example prefetchers state selector 208, the example model 210, the example queue 212, and/or, more generally, the example prefetcher controller 112 of FIG. 2 and/or the ML model trainer 114 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 200, the example timer 202, the example sleep state selector 204, the example score determiner 206, the example prefetchers state selector 208, the example model 210, the example queue 212, and/or, more generally, the example prefetcher controller 112 of FIG. 2 and/or the ML model trainer 114 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example prefetcher controller 112 and/or the ML model trainer 114 of FIG. 1 may include one or more elements, processes and/or devices in addition to, or instead of, those illustrated in FIGS. 1 and/or 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example prefetcher controller 112 and/or the ML model trainer 114 of FIGS. 1 and/or 2 are shown in FIGS. 3A-5. The machine readable instructions may be one or more executable programs or portion(s) of an executable program for execution by a computer processor such as the processor 612 shown in the example processor platform 600 discussed below in connection with FIG. 6. The program(s) may be embodied in software stored on a non-transitory computer readable storage medium such as a CD-ROM, a floppy disk, a hard drive, a DVD, a Blu-ray disk, or a memory associated with the processor 612, but the entirety of the program(s) and/or parts thereof could alternatively be executed by a device other than the processor 612 and/or embodied in firmware or dedicated hardware. Further, although the example program(s) is/are described with reference to the flowchart illustrated in FIG. 6, many other methods of implementing the example prefetcher controller 112 and/or the ML model trainer 114 of FIGS. 1 and/or 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3A, 3B, 4 and/or 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 3A:
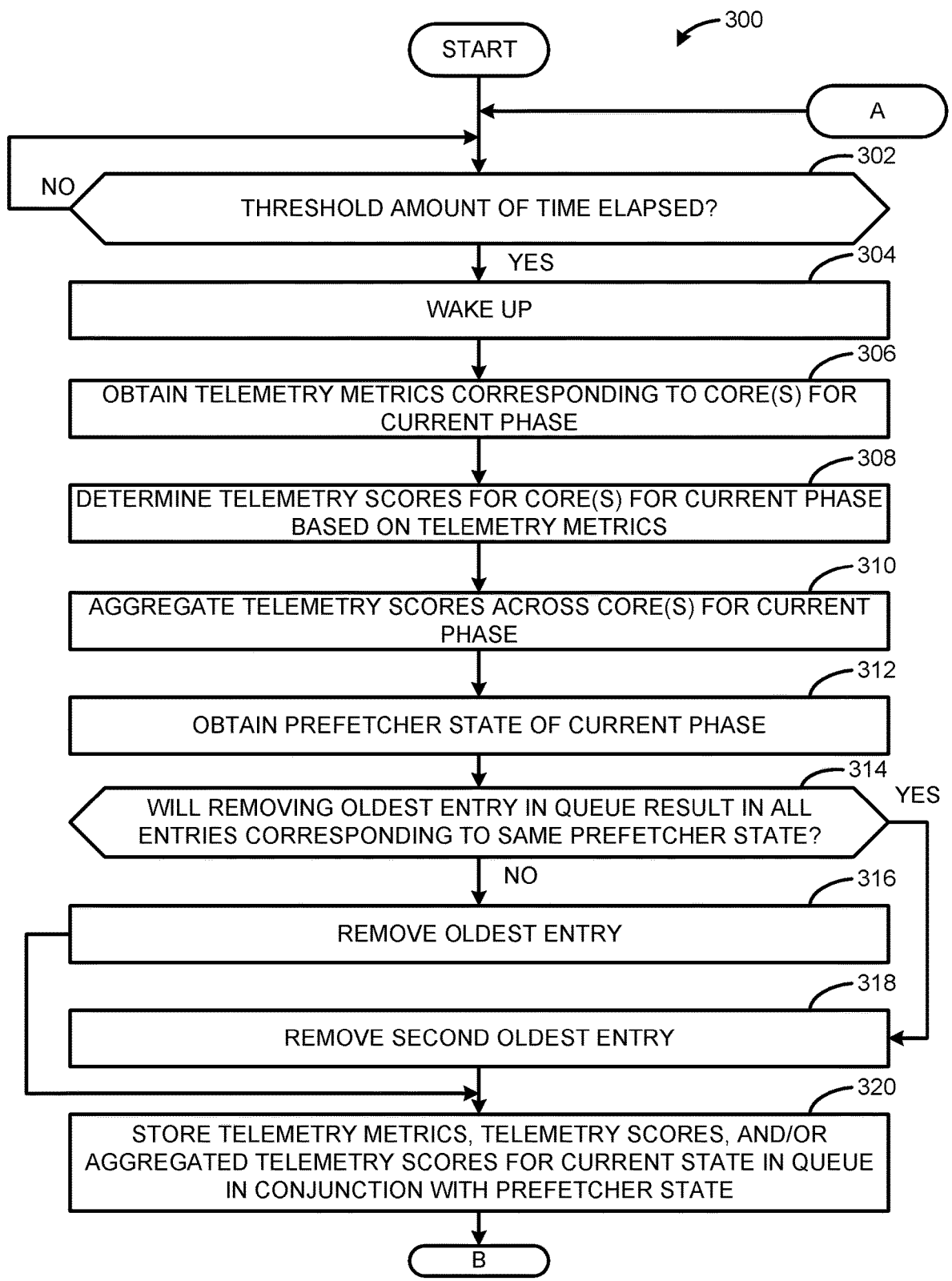
FIGS. 3A-3B illustrate a flowchart representative of example machine readable instructions that may be executed to implement the prefetcher controller of FIG. 1.
Figure 3B:
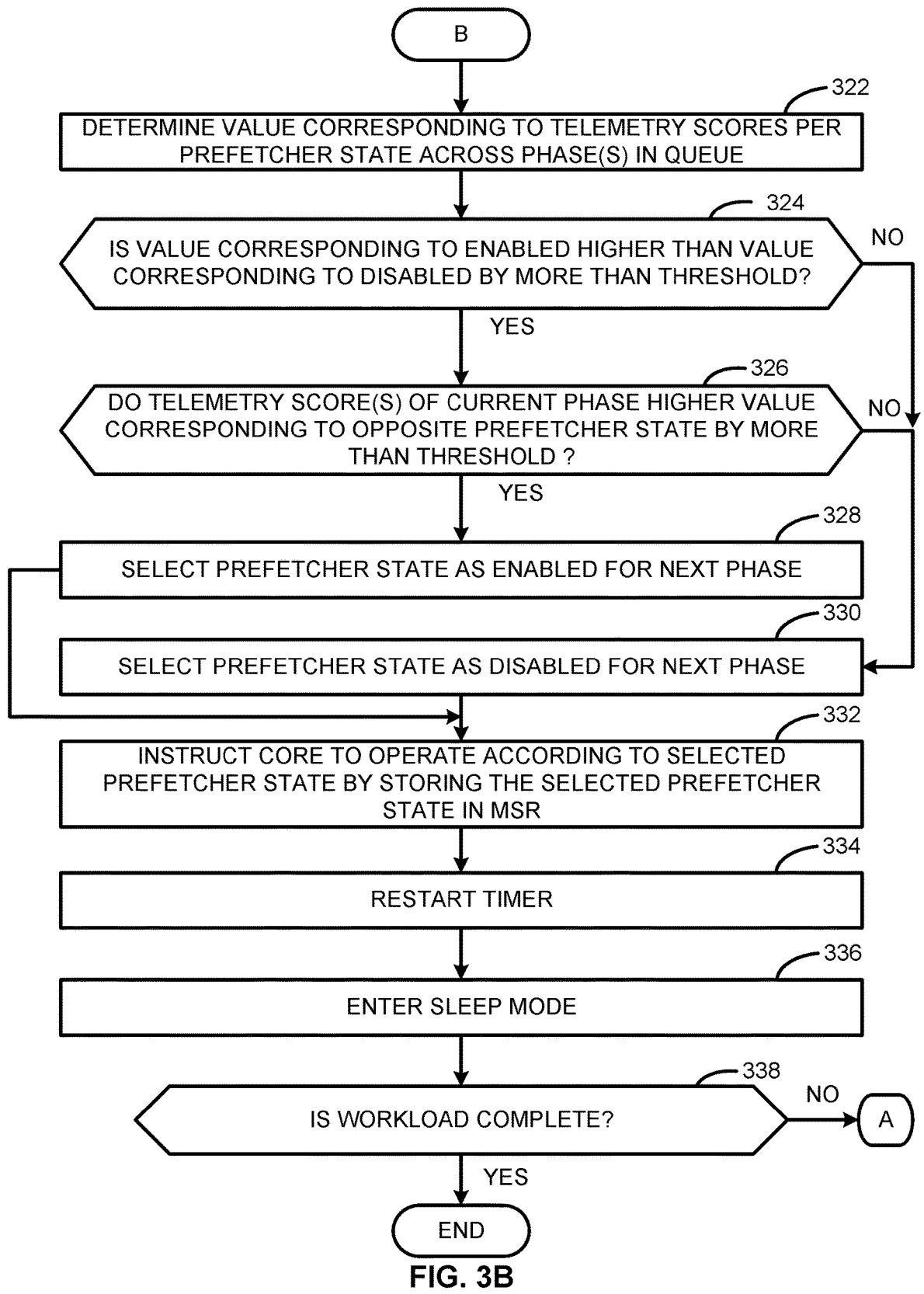

FIGS. 3A-3B illustrate a flowchart representative of example machine readable instructions 300 that may be executed to implement the example prefetcher controller 112 (FIGS. 1 and/or 2) to perform dynamic prefetcher control in a first mode. Although the flowchart of FIGS. 3A-3B is described in conjunction with the example prefetcher controller 112 of the example CPU 100, other type(s) of prefetcher controllers(s), and/or other type(s) of CPU(s) may be utilized instead.

At block 302, the example timer 202 (FIG. 2) determines if a threshold amount of time has elapsed. The example timer 202 monitors a clock of the CPU 100 and/or one or more of the core(s) 102 (FIG. 1) to determine when to sample a new phase. In some examples, the threshold amount of time (e.g., 500 milliseconds) is set to the sampling frequency for the prefetcher controller 112 (FIG. 1). If the example timer 202 determines that the threshold amount of time has not elapsed (block 302: NO), control returns to block 302 until the threshold amount of time has elapsed.

If the example timer 202 determines that the threshold amount of time has elapsed (block 302: YES), the example sleep state selector 204 (FIG. 2) wakes up components of the prefetcher controller 112 (block 304). For example, when not sampling, the sleep state selector 204 may turn off some components and/or operate under a low power mode to conserve energy. Accordingly, when the example prefetcher controller 112 is to sample, the sleep state selector 204 wakes up the sleeping components and/or exits from low power mode.

At block 306, the example interface 200 (FIG. 2) obtains telemetry data (e.g., telemetry metrics) corresponding to the core(s) for the current phase by accessing the counts of the corresponding counters 104 (FIG. 1). For example, the interface 200 may read (a) the values in the counters 104 corresponding to the clock time to determine the amount of time from the last phase (e.g., last time the counters were sampled) and (b) the number of retired instructions for the respective core(s) 102 from the last phase (e.g., the number of retired instructions from a counter minus the previous number of retired instructions for the counter at the previous sampled phase).

At block 308, the example score determiner 206 (FIG. 2) determines telemetry scores for the respective core(s) 102 for the current phase based on the respective telemetry metrics. For example, the score determiner 206 may determine the IPS for the respective core(s) 102 by dividing the number of retired instructions of each core by the amount of time since the last phase, resulting in X IPSs for the X cores. At block 310, the example score determiner 206 aggregates the telemetry scores across the core(s) for the current phase by adding the X IPSs. At block 312, the example score determiner 206 obtains the prefetcher state of the current phase (e.g., enabled or disabled). The queue 212 (FIG. 2) may have stored the prefetcher state locally or may access the MSR 106 (FIG. 1) and determine the current prefetcher state based on the value(s) stored in the MSR 106.

To be able to utilize prior phase data in determining a prefetcher state, the prefetcher controller 112 includes the example queue 212 (e.g., a cyclic sample queue, buffer, etc.) to store the X previous IPSs linked with the corresponding prefetcher state. As described below, prefetcher state selector 208 can compare the current IPSs to previous IPSs to determine whether to enable one or more prefetchers. Accordingly, the example score determiner 206 may need to ensure that the cache has at least one entry for a previous phase for each prefetcher state. Thus, at block 314, the example score determiner 206 determines if removing the oldest entry in the queue (e.g., cache) will result in all entries corresponding to the same prefetcher state.

If the example score determiner 206 determines that removing the oldest entry from the queue will not result in all entries corresponding to the same prefetcher state (e.g., there will be at least one entry corresponding to each prefetcher state) (block 314: NO), the score determiner 206 removes the oldest entry from the queue 212 to make space for the current entry (block 316). If the example score determiner 206 determines that removing the oldest entry from the queue 212 will result in all entries corresponding to the same prefetcher state (e.g., there will not be at least one entry corresponding to each prefetcher state) (block 314: YES), the score determiner 206 removes the second oldest entry from the queue 212 to make space for the current entry (block 318). In this manner, the queue will have at least one entry for each prefetcher state. In other examples, the score determiner 206 may explore a higher rate by ensuring at least one sample of each state within the last N phases (e.g., where N is less than the queue size), and modifying N according to the exploration usefulness. For example, if the exploration phase changes the prefetcher state based on the current phase, the score determiner 206 may make N smaller (e.g., unless N reaches a minimum value). If the exploration does not change the prefetcher state based on the current phase, the score determiner 206 may make N larger (e.g., saturated at the queue size minus a threshold number of entries for safety).

At block 320, the example score determiner 206 stores the telemetry data (e.g., telemetry metrics), telemetry scores, and/or aggregated telemetry score for the current state in the memory (e.g., the queue 212) in conjunction with the prefetcher state of the current phase. At block 322 (FIG. 3B), the example prefetcher state selector 208 (FIG. 2) determines the value corresponding to the telemetry score (e.g., average, weighted average, empirical value, etc.) per prefetcher state across phase(s) in the queue. For example, the queue 212 may have 40 entries in a queue that correspond to the prefetcher being enabled and 34 entries in the queue that correspond to the prefetcher being disabled. In such an example, the prefetcher state selector 208 adds up the telemetry scores for the 40 entries corresponding to enabled and divides the number by 40 to determine the value corresponding to the telemetry score for enabled. The prefetcher state selector 208 adds up the telemetry scores for the 34 entries corresponding to disabled and divides the number by 34 to determine the value corresponding to the telemetry score for disabled. In some examples, instead of performing divisions, the example prefetcher state selector 208 may add IPS scores per each prefetcher state and multiply by the number of the phases with the opposite prefetcher state to determine the value corresponding to the telemetry scores.

At block 324, the example prefetcher state selector 208 determines if the value corresponding to the telemetry score corresponding to enabled is higher than the value corresponding to the telemetry score corresponding to disabled by more than a threshold number or percentage (e.g., 10%). If the example prefetcher state selector 208 determines that the value corresponding to the telemetry score corresponding to enabled is not higher than the value corresponding to the telemetry score corresponding to disabled by more than a threshold (block 324: NO), control continues to block 330. If the example prefetcher state selector 208 determines that the value corresponding to the telemetry score corresponding to enabled is higher than the value corresponding to the telemetry score corresponding to disabled by more than a threshold (block 324: YES), the prefetcher state selector 208 determines if the telemetry score(s) of the core(s) 102 for the current phase is/are higher than the value corresponding to the telemetry score corresponding to the opposite prefetcher state to the current phase by more than a threshold (block 326). For example, if the current phase has a prefetcher state of disabled, the prefetcher state selector 208 compares the telemetry scores of the current phase to the value corresponding to the disable telemetry score. Although the example instructions 300 of FIG. 3 includes block 324 and 326 in a particular order, either block 324 or block 326 may be eliminated or the order of blocks 324 and 326 may be reversed depending on user and/or manufacturer preferences.

If the example prefetcher state selector 208 determines that the telemetry score(s) of the core(s) 102 for the current phase (e.g., all telemetry scores or more than a threshold number of telemetry scores) are higher than the value corresponding to the telemetry score corresponding to the opposite prefetcher state to the current phase by more than a threshold (block 326: YES), the prefetcher state selector 208 selects the prefetcher state as enabled for the next phase (block 328). If the example prefetcher state selector 208 determines that the telemetry score(s) of the core(s) 102 for the current phase (e.g., all telemetry scores or more than a threshold number of telemetry scores) are not higher than the value corresponding to the telemetry score corresponding to the opposite prefetcher state to the current phase by more than a threshold (block 326: NO), the prefetcher state selector 208 selects the prefetcher state as disabled for the next phase (block 330).

At block 332, the example interface 200 instructs the core(s) 102 to operate according to the selected prefetcher state for the next phase by storing a value corresponding to the selected prefetcher state in the MSR(s) 106 of the core(s) 102. In this manner, the core(s) 102 can read the values stored in the respective MSR(s) 106 and enable or disable prefetcher(s) for the next phase. At block 334, the example timer 202 restarts. At block 336, the example sleep state selector 204 enters a sleep mode (e.g., by powering down components and/or entering a low power mode). At block 338, the example sleep state selector 204 determines if the workload is complete. If the example sleep state selector 204 determines that the workload is not complete (block 338: NO), control returns to block 302 of FIG. 3A for a subsequent sample for a subsequent phase. If the example sleep state selector 204 determines that the workload is complete (block 338: YES), the instructions end.

Figure 4:
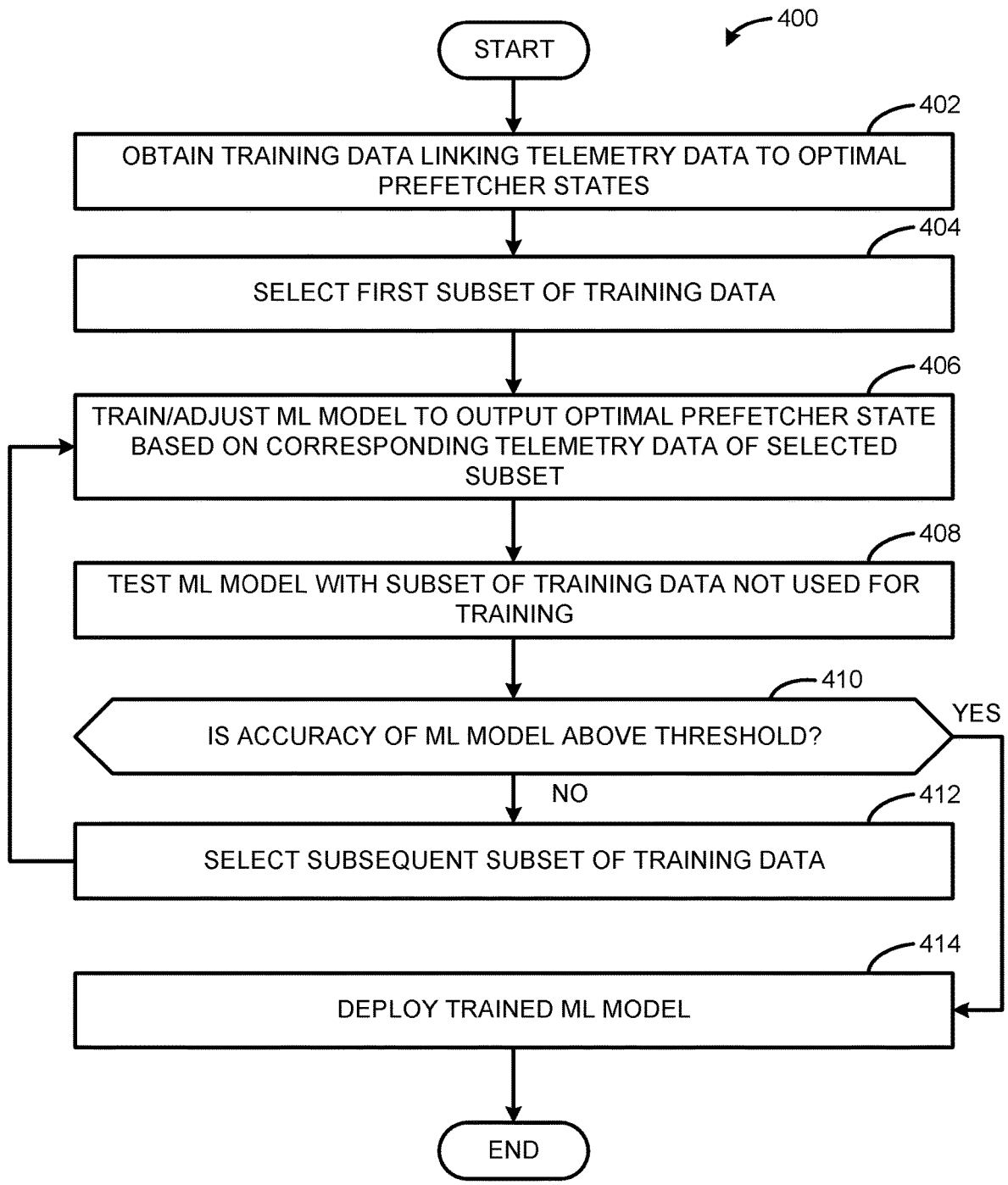
FIG. 4 illustrates a flowchart representative of example machine readable instructions that may be executed to implement the machine learning model trainer of FIG. 1.

FIG. 4 illustrates a flowchart representative of example machine readable instructions 400 that may be executed to implement the example ML model trainer 114 to train a ML model to dynamically select one or more prefetcher state(s) for the core(s) 102 based on telemetry data. Although the flowchart of FIG. 4 is described in conjunction with the example ML model trainer 114, other type(s) of model trainers(s) may be utilized instead.

At block 402, the example ML model trainer 114 (FIG. 1) obtains training data linking telemetry data to optimal prefetcher states. At block 404, the example ML model trainer 114 selects a first subset of the training data (e.g., 70% of the training data). At block 406, the example ML model trainer 114 trains (e.g., during an initial iteration) and/or adjusts (e.g., during a subsequent iteration) the ML model to output the optimal prefetcher state based on the corresponding telemetry data of the selected subset of the training data. For example, the ML model trainer 114 may adjust the weights of neurons in a neural network so that the input telemetry data will result in the corresponding optimal prefetcher state output when applied to the neural network.

At block 408, the example ML model trainer 114 tests the ML model with a subset of training data not used for training. For example, the ML model trainer 114 may use the telemetry data of the subset of the training data that has not been used to train and/or adjust the ML model as inputs and determine the accuracy of the neural network by comparing the output telemetry state with the corresponding optimal prefetcher state from the subset of the training data. The more output prefetcher states that match the corresponding training data, the higher the accuracy of the neural network model. At block 410, the example ML model trainer 114 determines if the accuracy of the ML model is above a threshold.

If the example ML model trainer 114 determines that the accuracy of the ML model is not above the threshold (block 410: NO), the ML model trainer 114 selects a subsequent subset of training data that has not been used to train and/or adjust the ML model (block 412), and control returns to block 406 to adjust the ML model based on the subsequent subset to increase the accuracy of the ML model. If the example ML model trainer 114 determines that the accuracy of the ML model is above the threshold (block 410: YES), the ML model trainer 114 deploys the trained ML model to the example prefetcher controller 112 (FIG. 1) of the CPU 100 of FIG. 1 (block 414). The example instructions of FIG. 4 end.

Figure 5:
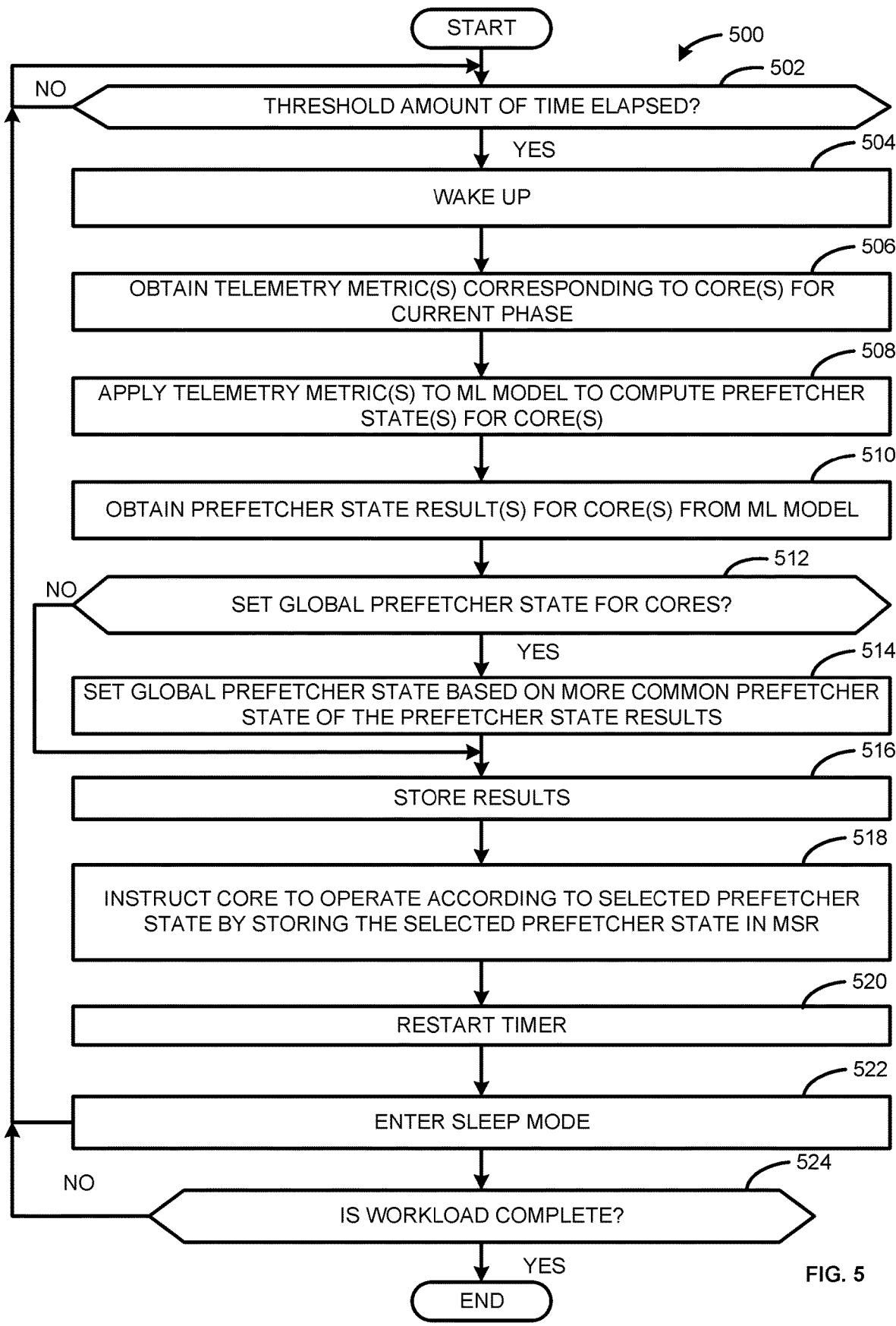
FIG. 5 illustrates a flowchart representative of example machine readable instructions that may be executed to implement the prefetcher controller of FIG. 1.

FIG. 5 illustrates a flowchart representative of example machine readable instructions 500 that may be executed to implement the example prefetcher controller 112 (FIGS. 1 and/or 2) to perform dynamic prefetcher control in a second mode using a ML model. Although the flowchart of FIG. 5 is described in conjunction with the example prefetcher controller 112 of the example CPU 100, other type(s) of prefetcher controllers(s), and/or other type(s) of CPU(s) may be utilized instead.

At block 502, the example timer 202 (FIG. 2) determines if a threshold amount of time has elapsed. The example timer 202 may monitor a clock of the CPU 100 (FIG. 1) and/or one or more of the core(s) 102 (FIG. 1) to determine when the sample a new phase. The threshold amount of time corresponds to the sampling frequency for the prefetcher controller 112 (FIG. 1). If the example timer 202 determines that the threshold amount of time has not elapsed (block 502: NO), control returns to block 502 until the threshold amount of time has elapsed.

If the example timer 202 determines that the threshold amount of time has elapsed (block 502: YES), the example sleep state selector 204 (FIG. 2) wakes up components of the prefetcher controller 112 (block 504). For example, when not sampling, the sleep state selector 204 may turn off some components and/or operate under a low power mode to conserve energy. Accordingly, when the example prefetcher controller 112 is to sample, the sleep state selector 204 needs to wake up the sleeping components and/or exit from low power mode.

At block 506, the example interface 200 (FIG. 2) obtains (e.g., using a component interface) telemetry data (e.g., telemetry metrics) corresponding to the core(s) for the current phase by accessing the counts of the corresponding counters 104 (FIG. 1). For example, the interface 200 may obtain core metrics and/or uncore metrics. In some examples, the telemetry data may also include telemetry data from prior phases.

At block 508, the example model 210 (FIG. 2) applies (e.g., inputs) the telemetry metric(s) to compute the prefetcher state(s) for the core(s) 102. For example, the prefetcher controller 112 can apply the telemetry data from a first core to the model 210 to obtain a first prefetcher state, the telemetry data from a second core to the model 210 to obtain a second prefetcher state, etc. In some examples, the score determiner 206 (FIG. 2) may convert one or more of the telemetry metrics into telemetry scores prior to applying to the model 210 (e.g., calculating a PSI based on the clock and number of retired instructions). The model 210 is implemented based on model data deployed by the ML model trainer 114 to be implemented in the prefetcher controller 112. At block 510, the example prefetcher state selector 208 obtains the prefetcher state result(s) for the respective core(s) 102 from the model 210.

At block 512, the example prefetcher state selector 208 (FIG. 2) determines if a global prefetcher state is to be set for the cores 102 (e.g., if the prefetcher state should be the same across the cores 102), which may be hardcoded or a setting based on user and/or manufacturer preferences. If the example prefetcher state selector 208 determines that a global prefetcher state should be set across the core(s) 102 (block 512: YES), the example prefetcher state selector 208 sets the global prefetcher state based on the more common prefetcher states of the prefetcher state results (block 514). For example, if five of the output prefetcher probabilities for the cores 102 correspond to prefetcher enable and two of the output prefetcher probabilities for the cores 102 correspond to prefetcher disable, then the prefetcher state selector 208 sets the prefetcher state to enable for all cores 102.

If the example prefetcher state selector 208 determines not to set a global prefetcher state across the core(s) 102 (block 512: NO), the example prefetcher state selector 208 stores the results in the queue 212 (block 516). In this manner, the prefetcher state selector 208 can monitor the history prefetcher states and/or mark selected prefetcher states as efficient or inefficient based on whether the prefetched data was used or not during implementation. In this manner, the example prefetcher state selector 208 can use the historical data for subsequent phases and/or to tune the implemented model 210. At block 518, the example interface 200 instructs the core(s) 102 to operate according to the selected prefetcher state(s) for the next phase by storing a value corresponding to the selected prefetcher state in the MSR(s) 106 (FIG. 1) of the core(s) 102. In this manner, the example core(s) 102 can read the values stored in the respective MSR(s) 106 and enable or disable prefetcher(s) for the next phase. If a global prefetcher state was determined, the example interface 200 stores the global prefetcher state in all MSRs 106 across all core(s) 102. If a global prefetcher state is not determined, the example interface 200 stores a value in the MSR 106 corresponding to the prefetcher state determined with respect to the corresponding core 102.

At block 520, the example timer 202 restarts. At block 522, the example sleep state selector 204 enters a sleep mode (e.g., by powering down components and/or entering a low power mode). At block 524, the example sleep state selector 204 determines if the workload is complete. If the example sleep state selector 204 determines that the workload is not complete (block 524: NO), control returns to block 502 for a subsequent sample for a subsequent phase. If the example prefetcher controller 112 determines that the workload is complete (block 524: YES), the instructions end.

Figure 6:
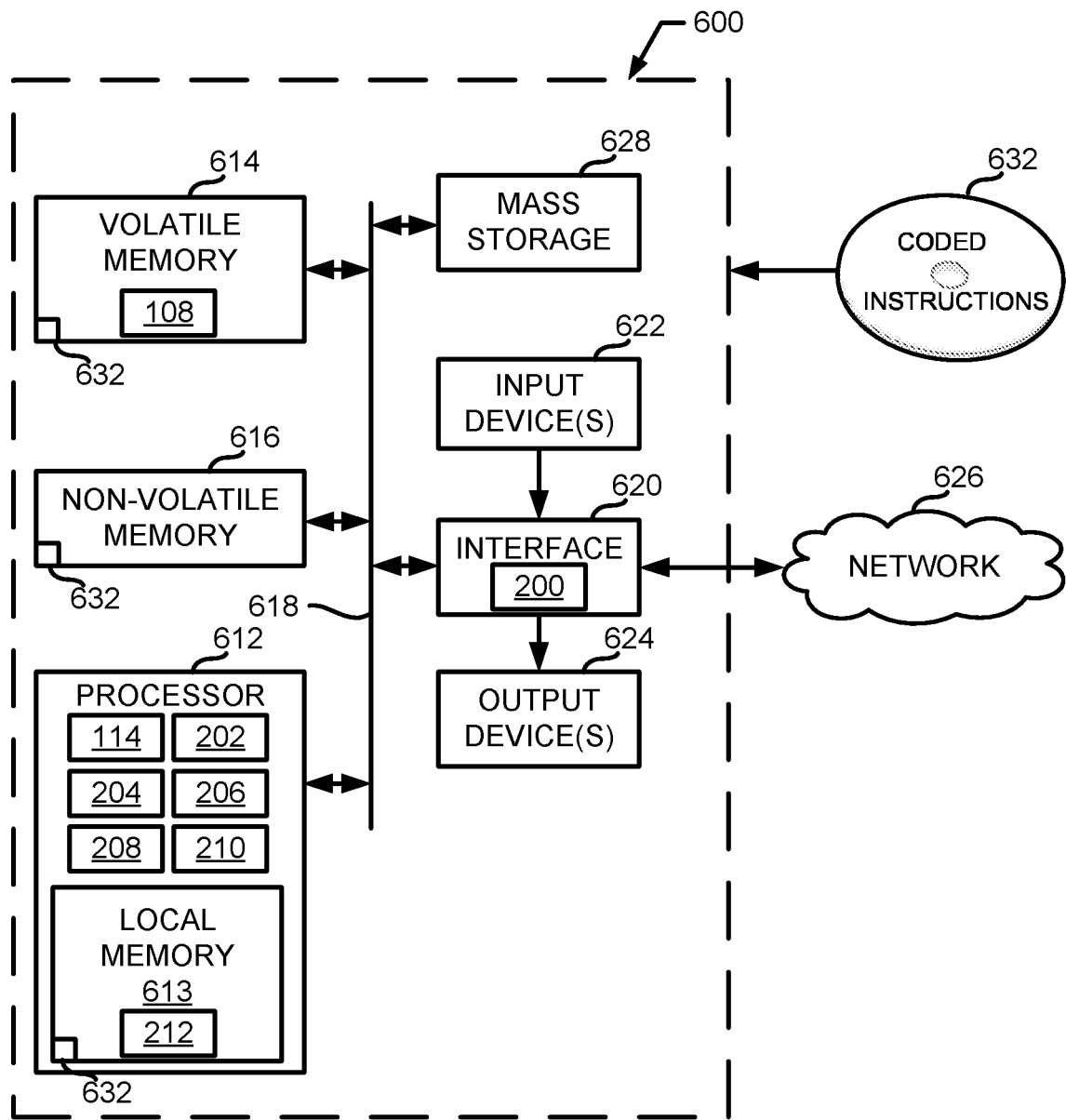
FIG. 6 is a block diagram of an example processor platform structured to execute the instructions of FIGS. 3A, 3B, 4 and/or 5 to implement the prefetcher controller and/or the machine learning trainer of FIG. 1.

FIG. 6 is a block diagram of an example processor platform 600 structured to execute the instructions of FIGS.

3A, 3B, 4, and/or 5 to implement the example prefetcher controller 112 and/or the ML model trainer 114 of FIG. 1. The processor platform 600 can be, for example, a server, a personal computer, a workstation, a self-learning machine (e.g., a neural network), a mobile device (e.g., a cell phone, a smart phone, a tablet such as an iPad), or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example ML model trainer 114 of FIG. 1 and/or the example timer 202, the example sleep state selector 204, the example score determiner 206, the example prefetcher state selector 208, and/or the example model 210 of FIG. 2.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller. In some examples, the main memory 614 implements the example memory 108 and the example local memory 613 implements the example queue 212 of FIG. 1.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface. In the example of FIG. 6, the interface circuit 620 implements the interface 200 of FIG. 2. However, the interface 20 may be a separate component from the interface circuit 620 of FIG. 6.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip, and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 3A, 3B, 4, and/or 5 may be stored in the mass storage device 628, in the volatile memory 614, in the non-volatile memory 616, and/or on a removable non-transitory computer readable storage medium such as a CD or DVD.

Example methods, apparatus, systems, and articles of manufacture dynamically enable and/or disable prefetchers are disclosed herein. Further examples and combinations thereof include the following: Example 1 includes an apparatus to dynamically enable or disable a prefetcher, the apparatus comprising an interface to access telemetry data, the telemetry data corresponding to a counter of a core in a central processing unit, the counter corresponding to a first phase of a workload executed at the central processing unit, a prefetcher state selector to select a prefetcher state for a subsequent phase based on the telemetry data, and the interface to instruct the core in the central processing unit to operate in the subsequent phase according to the prefetcher state.

Example 2 includes the apparatus of example 1, further including a score determiner to determine a telemetry score for the core at the first phase using the telemetry data, the telemetry score corresponding to instructions per second for the first phase.

Example 3 includes the apparatus of example 2, wherein the prefetcher state is a first prefetcher state, the prefetcher state selector to determine a first value corresponding to first telemetry scores for a second prefetcher state across a plurality of previous phases, and determine a second value corresponding to second telemetry scores for a third prefetcher state across the plurality of previous phases, the third prefetcher state different than the first prefetcher state.

Example 4 includes the apparatus of example 3, wherein the prefetcher state selector is to select the first prefetcher state for the subsequent phase based on a comparison of (a) the telemetry score for the core at the first phase and (b) the first value of the second prefetcher state across the plurality of previous phases, the first prefetcher state of the core at the first phase being the third prefetcher state.

Example 5 includes the apparatus of example 3, wherein the prefetcher state selector is to select the first prefetcher state for the subsequent phase based on a comparison of (a) the first value of the second prefetcher state across the plurality of previous phases and (b) the second value of the third prefetcher state across the plurality of previous phases.

Example 6 includes the apparatus of example 1, wherein the prefetcher state is a first prefetcher state, further including storage to store at least one of the telemetry data of the core at the first phase or a telemetry score of the core at the first phase in conjunction with a second prefetcher state of the core at the first phase.

Example 7 includes the apparatus of example 6, wherein the storage is to store at least one of previous telemetry data of the core at previous phases or previous telemetry scores of the core at the previous phases in conjunction with previous prefetcher states of the core at the previous phases.

Example 8 includes a non-transitory computer readable storage medium comprising instruction which, when executed, cause a processor to at least access telemetry data, the telemetry data corresponding to a counter of a core in a central processing unit, the counter corresponding to a first phase of a workload executed at the central processing unit, select a prefetcher state for a subsequent phase based on the telemetry data, and instruct the core in the central processing unit to operate in the subsequent phase according to the prefetcher state.

Example 9 includes the computer readable medium of example 8, wherein the instructions are to cause the processor to determine a telemetry score for the core at the first phase using the telemetry data, the telemetry score corresponding to instructions per second for the first phase.

Example 10 includes the computer readable medium of example 9, wherein the prefetcher state is a first prefetcher state, the instructions to cause the processor to determine a first value corresponding to first telemetry scores for a second prefetcher state across a plurality of previous phases, and determine a value corresponding to first average telemetry scores for a third prefetcher state across the plurality of previous phases, the third prefetcher state different than the first prefetcher state.

Example 11 includes the computer readable medium of example 10, wherein the instructions are to cause the processor to select the first prefetcher state for the subsequent phase based on a comparison of (a) the telemetry score for the core at the first phase and (b) the first value telemetry score of the second prefetcher state across the plurality of previous phases, the first prefetcher state of the core at the first phase being the third prefetcher state.

Example 12 includes the computer readable medium of example 10, wherein the instructions are to cause the processor to select the first prefetcher state for the subsequent phase based on a comparison of (a) the first value telemetry score of the second prefetcher state across the plurality of previous phases and (b) the second value telemetry score of the third prefetcher state across the plurality of previous phases.

Example 13 includes the computer readable medium of example 8, wherein the prefetcher state is a first prefetcher state, the instructions to cause the processor to store at least one of the telemetry data of the core at the first phase or a telemetry score of the core at the first phase in conjunction with a second prefetcher state of the core at the first phase.

Example 14 includes the computer readable medium of example 13, wherein the instructions are to cause the processor to store at least one of previous telemetry data of the core at previous phases or previous telemetry scores of the core at the previous phases in conjunction with previous prefetcher states of the core at the previous phases.

Example 15 includes a method to dynamically enable or disable a prefetcher, the method comprising accessing, by executing an instruction with a processor, telemetry data, the telemetry data corresponding to a counter of a core in a central processing unit, the counter corresponding to a first phase of a workload executed at the central processing unit, selecting, by executing an instruction with the processor, a prefetcher state for a subsequent phase based on the telemetry data, and instructing, by executing an instruction with the processor, the core in the central processing unit to operate in the subsequent phase according to the prefetcher state.

Example 16 includes the method of example 15, further including determining a telemetry score for the core at the first phase using the telemetry data, the telemetry score corresponding to instructions per second for the first phase.

Example 17 includes the method of example 16, wherein the prefetcher state is a first prefetcher state, further including determining a first value corresponding to first telemetry scores for a second prefetcher state across a plurality of previous phases, and determining a second value corresponding to second telemetry scores for a third prefetcher state across the plurality of previous phases, the third prefetcher state different than the first prefetcher state.

Example 18 includes the method of example 17, further including selecting the first prefetcher state for the subsequent phase based on a comparison of (a) the telemetry score for the core at the first phase and (b) the first value telemetry score of the second prefetcher state across the plurality of previous phases, the first prefetcher state of the core at the first phase being the third prefetcher state.

Example 19 includes the method of example 17, further including selecting the first prefetcher state for the subsequent phase based on a comparison of (a) the first value telemetry score of the second prefetcher state across the plurality of previous phases and (b) the second value telemetry score of the third prefetcher state across the plurality of previous phases.

Example 20 includes the method of example 15, wherein the prefetcher state is a first prefetcher state, further including storing at least one of the telemetry data of the core at the first phase or a telemetry score of the core at the first phase in conjunction with a second prefetcher state of the core at the first phase.

Example 21 includes the method of example 20, further including storing at least one of previous telemetry data of the core at previous phases or previous telemetry scores of the core at the previous phases in conjunction with previous prefetcher states of the core at the previous phases.

From the foregoing, it will be appreciated that example methods, apparatus and articles of manufacture have been disclosed herein to dynamically enable and/or disable prefetchers. Disclosed methods, apparatus and articles of manufacture improve the efficiency of a computer by enabling prefetchers when appropriate to decrease latency and disable prefetchers when appropriate to eliminate access prefetching of data that is to execute a workload. Disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to dynamically enable or disable a prefetcher, the apparatus comprising:
an interface to access telemetry data, the telemetry data corresponding to a counter of a core in a central processing unit, the counter corresponding to a current phase of a workload executed at the central processing unit when the core is operating in an enabled prefetcher state;
prefetcher state selector software to select a disabled prefetcher state for a subsequent phase based on (a) a first telemetry score of the current phase of the workload and (b) a second telemetry score corresponding to an opposite prefetcher state relative to the current phase; and the interface to instruct the core in the central processing unit to operate in the subsequent phase according to the disabled prefetcher state.

2. The apparatus of claim 1, further including score determiner software to determine a telemetry score for the core at the current phase using the telemetry data, the telemetry score corresponding to instructions per second for the current phase.

3. The apparatus of claim 2, wherein the enabled prefetcher state is a first enabled prefetcher state and the disabled prefetcher state is a first disabled prefetcher state, the prefetcher state selector software to:

determine a first value corresponding to first telemetry scores for second disabled prefetcher states across a plurality of previous phases of the workload; and determine a second value corresponding to second telemetry scores for second enabled prefetcher states across the plurality of previous phases.

4. The apparatus of claim 3, wherein the prefetcher state selector software is to select the disabled prefetcher state for the subsequent phase based on a difference between (a) a third value corresponding to the first telemetry score of the first current phase of the workload and (b) the first value corresponding to the first telemetry score for the second disabled prefetcher states across the plurality of previous phases of the workload.

5. The apparatus of claim 3, wherein the prefetcher state selector software is to select the disabled prefetcher state for the subsequent phase based on a comparison of (a) the first value of the second disabled prefetcher states across the plurality of previous phases and (b) the second value of the second enabled prefetcher states across the plurality of previous phases.

6. The apparatus of claim 1, further including storage to store at least one of the telemetry data of the core at the current phase or a telemetry score of the core at the current phase in conjunction with the enabled prefetcher state of the core at the current phase.

7. The apparatus of claim 6, wherein the storage is to store at least one of previous telemetry data of the core at previous phases or previous telemetry scores of the core at the previous phases in conjunction with previous prefetcher states of the core at the previous phases.

8. A non-transitory computer readable storage medium comprising instructions which, when executed, cause a processor to at least:

access telemetry data, the telemetry data corresponding to a counter of a core in a central processing unit, the counter corresponding to a current phase of a workload executed at the central processing unit when the core is operating in an enabled prefetcher state;

select a disabled prefetcher state for a subsequent phase based on (a) a first telemetry score of the current phase of the workload and (b) a second telemetry score corresponding to an opposite prefetcher state relative to the current phase; and instruct the core in the central processing unit to operate in the subsequent phase according to the disabled prefetcher state.

9. The computer readable storage medium of claim 8, wherein the instructions are to cause the processor to determine a telemetry score for the core at the current phase using the telemetry data, the telemetry score corresponding to instructions per second for the current phase.

10. The computer readable storage medium of claim 9, wherein the enabled prefetcher state is a first enabled prefetcher state and the disabled prefetcher state is a first disabled prefetcher state, the instructions to cause the processor to:

determine a first value corresponding to first telemetry scores for second disabled prefetcher states across a plurality of previous phases of the workload; and determine a second value corresponding to first average telemetry scores for second enabled prefetcher states across the plurality of previous phases.

11. The computer readable storage medium of claim 10, wherein the instructions are to cause the processor to select the disabled prefetcher state for the subsequent phase based on a difference between (a) a third value corresponding to the first telemetry score of the current phase of the workload and (b) the first value corresponding to the first telemetry score for the second disabled prefetcher states across the plurality of previous phases of the workload.

12. The computer readable storage medium of claim 10, wherein the instructions are to cause the processor to select the disabled prefetcher state for the subsequent phase based on a comparison of (a) the first value of the second disabled prefetcher states across the plurality of previous phases and (b) the second value of the second enabled prefetcher states across the plurality of previous phases.

13. The computer readable storage medium of claim 8, wherein the instructions are to cause the processor to store at least one of the telemetry data of the core at the current phase or a telemetry score of the core at the current phase in conjunction with the enabled prefetcher state of the core at the current phase.

14. The computer readable storage medium of claim 13, wherein the instructions are to cause the processor to store at least one of previous telemetry data of the core at previous phases or previous telemetry scores of the core at the previous phases in conjunction with previous prefetcher states of the core at the previous phases.

15. A method to dynamically enable or disable a prefetcher, the method comprising:

accessing, by executing an instruction with a processor, telemetry data, the telemetry data corresponding to a counter of a core in a central processing unit, the counter corresponding to a current phase of a workload executed at the central processing unit when the core is operating in an enabled prefetcher state;

selecting, by executing an instruction with the processor, a disabled prefetcher state for a subsequent phase based on (a) a first telemetry score of the current phase of the workload and (b) a second telemetry score corresponding to an opposite prefetcher state relative to the current phase; and instructing, by executing an instruction with the processor, the core in the central processing unit to operate in the subsequent phase according to the disabled prefetcher state.

16. The method of claim 15, further including determining a telemetry score for the core at the current phase using the telemetry data, the telemetry score corresponding to instructions per second for the current phase.

17. The method of claim 16, wherein the enabled prefetcher state is a first enabled prefetcher state and the disabled prefetcher state is a first disabled prefetcher state, further including:

determining a first value corresponding to first telemetry scores for second disabled prefetcher states across a plurality of previous phases of the workload; and determining a second value corresponding to second telemetry scores for second enabled prefetcher states across the plurality of previous phases.

18. The method of claim 17, further including selecting the disabled prefetcher state for the subsequent phase based on a difference between (a) a third value corresponding to the first telemetry score of the current phase of the workload and (b) the first value corresponding to the first telemetry score for the second disabled prefetcher states across the plurality of previous phases of the workload.

19. The method of claim 17, further including selecting the disabled prefetcher state for the subsequent phase based on a comparison of (a) the first value of the second disabled prefetcher states across the plurality of previous phases and (b) the second value of the second enabled prefetcher states across the plurality of previous phases.

20. The method of claim 15, further including storing at least one of the telemetry data of the core at the current phase or a telemetry score of the core at the current phase in conjunction with the enabled prefetcher state of the core at the current phase.

21. The method of claim 20, further including storing at least one of previous telemetry data of the core at previous phases or previous telemetry scores of the core at the previous phases in conjunction with previous prefetcher states of the core at the previous phases.

22. An apparatus to dynamically enable or disable a prefetcher, the apparatus comprising:
  interface circuitry to access telemetry data corresponding to a counter of a core in processor circuitry, the counter corresponding to a current phase of a workload executed at the processor circuitry when the core is operating in an enabled prefetcher state;
  instructions; and
  the processor circuitry to execute the instructions to:
    select a disabled prefetcher state for a subsequent phase based on (a) a first telemetry score of the current phase of the workload and (b) a second telemetry score corresponding to an opposite prefetcher state relative to the current phase; and
    instruct the core in the processor circuitry to operate in the subsequent phase according to the disabled prefetcher state.

23. The apparatus of claim 22, wherein the processor circuitry is to determine a telemetry score for the core at the current phase using the telemetry data, the telemetry score corresponding to instructions per second for the current phase.

24. The apparatus of claim 23, wherein the enabled prefetcher state is a first enabled prefetcher state and the disabled prefetcher state is a first disabled prefetcher state, the processor circuitry to:
  determine a first value corresponding to first telemetry scores for second disabled prefetcher states across a plurality of previous phases of the workload; and
  determine a second value corresponding to first average telemetry scores for second enabled prefetcher states across the plurality of previous phases.

25. The apparatus of claim 24, wherein the processor circuitry is to select the disabled prefetcher state for the subsequent phase based on a difference between (a) a third value corresponding to the first telemetry score of the current phase of the workload and (b) the first value corresponding to the first telemetry score for the second disabled prefetcher states across the plurality of previous phases of the workload.

26. The apparatus of claim 24, wherein the processor circuitry is to select the disabled prefetcher state for the subsequent phase based on a comparison of (a) the first value of the second disabled prefetcher states across the plurality of previous phases and (b) the second value of the second enabled prefetcher states across the plurality of previous phases.

27. The apparatus of claim 22, wherein the processor circuitry is to store at least one of the telemetry data of the core at the current phase or a telemetry score of the core at the current phase in conjunction with the enabled prefetcher state of the core at the current phase.

28. The apparatus of claim 27, wherein the processor circuitry is to store at least one of previous telemetry data of the core at previous phases or previous telemetry scores of the core at the previous phases in conjunction with previous prefetcher states of the core at the previous phases.

* * * * *

UNITED STATES PATENT AND TRADEMARK OFFICE
CERTIFICATE OF CORRECTION

| | | |
|---|---|---|
| PATENT NO. | : 11,720,364 B2 | Page 1 of 1 |
| APPLICATION NO. | : 17/033282 | |
| DATED | : August 8, 2023 | |
| INVENTOR(S) | : Alam et al. | |

It is certified that error appears in the above-identified patent and that said Letters Patent is hereby corrected as shown below:

In the Claims

On Column 21, Line 26, Claim 4, delete "first current phase" and insert --current phase--.

Signed and Sealed this
Thirteenth Day of February, 2024

*Katherine Kelly Vidal*

Katherine Kelly Vidal
*Director of the United States Patent and Trademark Office*